Уnited States Patent [19]

Guigan

[11] Patent Number: 5,315,886
[45] Date of Patent: May 31, 1994

[54] APPARATUS FOR DRAWING OFF AND DISPENSING A PREDETERMINED QUANTITY OF A LIQUID

[76] Inventor: Jean Guigan, 5, rue des Ursulines, 75005 Paris, France

[21] Appl. No.: 787,087

[22] Filed: Nov. 1, 1991

[30] Foreign Application Priority Data

Jun. 28, 1991 [FR] France .................. 91 08075

[51] Int. Cl.⁵ .............................................. B01L 3/02
[52] U.S. Cl. ............................ 73/864.02; 73/864.11
[58] Field of Search ........... 73/864.01, 864.02, 864.14, 73/864.72, 864.11; 141/34; 222/168, 169, 357

[56] References Cited

U.S. PATENT DOCUMENTS

| | | | |
|---|---|---|---|
| 3,191,813 | 6/1965 | Duff | 73/864.72 |
| 3,757,585 | 9/1973 | Gallant | 73/864.72 |
| 4,010,647 | 3/1977 | Kissell et al. | 73/864.34 |
| 4,874,114 | 10/1989 | Guigan | 73/864.02 |

OTHER PUBLICATIONS

Translation of JP-262751, by Tominaga et al.

Primary Examiner—Hezron E. Williams
Assistant Examiner—Nashmiya Ashraf
Attorney, Agent, or Firm—Sughrue, Mion, Zinn, Macpeak & Seas

[57] ABSTRACT

Apparatus for drawing off and dispensing a predetermined quantity of liquid is of the type which includes a tube designed to contain said predetermined quantity of liquid. The tube has an open end via which the liquid is both drawn in and dispensed. The tube (10) is closed at an end (15) opposite from the open end (16). The inside volume of the tube (10) corresponds to the predetermined quantity. The tube (10) is rotated about an axis (11) by drive means. The tube axis (11) is spaced from over the complete length of the tube, from the closed end (15) to the open end (16). When the drive means rotate the tube in one direction, it is fully filled with the liquid (21) with the tube open end (16) immersed. When the drive means rotate the tube (10) in the opposite direction, it is fully emptied of the liquid (21) that it contains.

5 Claims, 3 Drawing Sheets

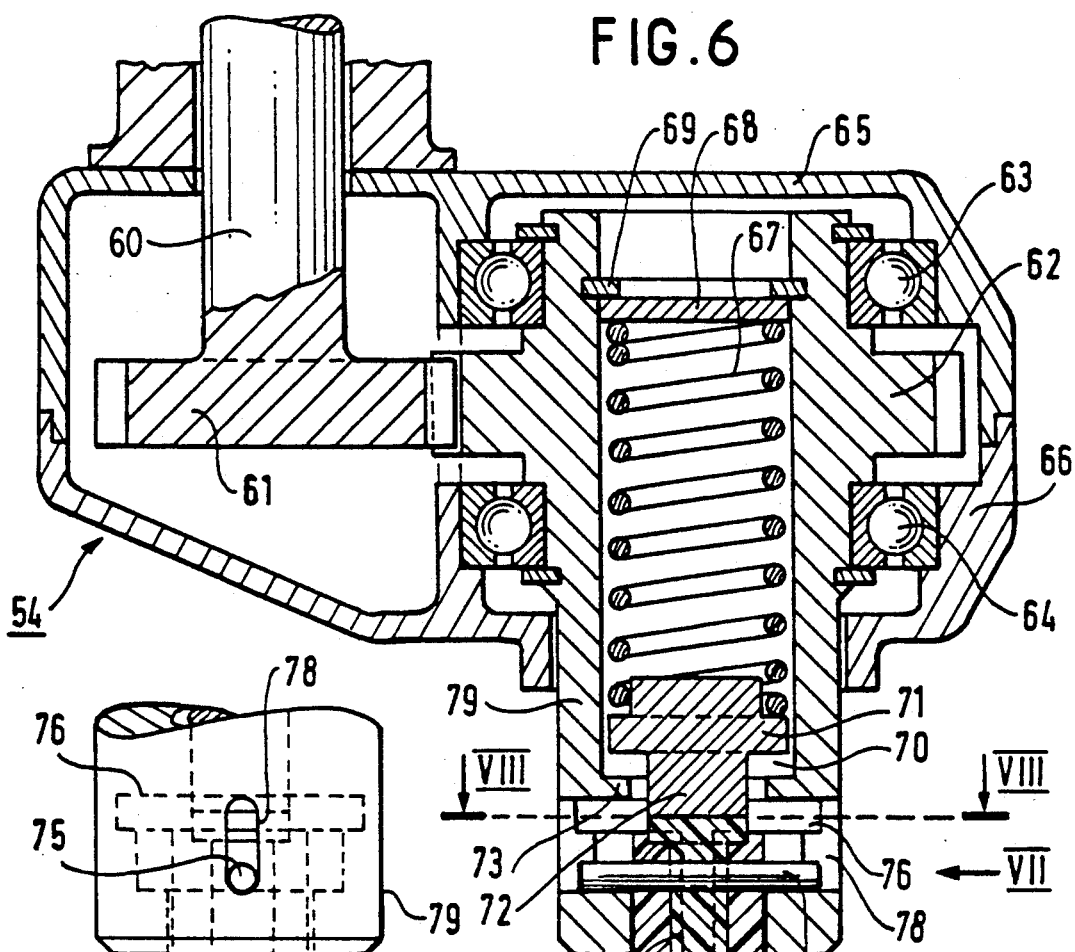
FIG.6
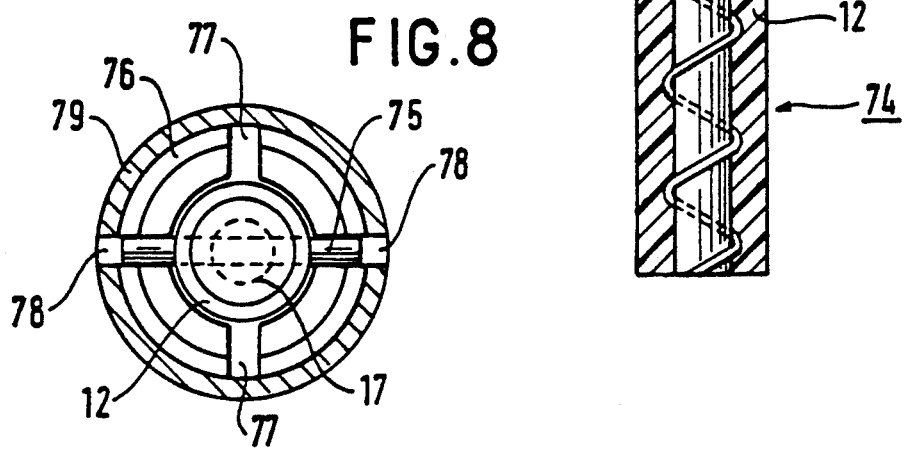
FIG.7
FIG.8

APPARATUS FOR DRAWING OFF AND DISPENSING A PREDETERMINED QUANTITY OF A LIQUID

FIELD OF THE INVENTION

The invention relates to apparatus enabling a predetermined quantity of a liquid to be drawn off and dispensed.

BACKGROUND OF THE INVENTION

In laboratory analyses, it is often necessary to put a predetermined quantity of a liquid substance such as a serum or a reagent into a receptacle. This is commonly achieved by means of a graduated pipette which is used to suck up a certain quantity of liquid; thereafter, the predetermined quantity of liquid is dispensed by pressure.

However, when the dose to be dispensed is very small, this method suffers from being inaccurate.

Such a pipette enables quantities of liquid of about 25 microliters to be drawn off to within 5%. Such a quantity constitutes a considerable degree of inaccuracy, in particular in the event that the liquid to be drawn off is a reagent intended make another substance react for the purposes of analysis, e.g. a serum. In view of the high cost of certain reagents, research is being directed into decreasing the quantities of reagent used to as little as possible so as to make savings.

U.S. Pat. No. 4,874,114 describes a pipette for dispensing a predetermined dose of a liquid, which pipette is constituted by a hollow hemisphere fixed at one end of a rod. The hemisphere defines a volume corresponding to a certain quantity of liquid to be drawn off.

The volume is filled with a liquid by rotating the pipette at high speed about an axis by means of the rod. The speed of rotation is such that the centrifugal forces obtained are sufficient, for a liquid of given viscosity, to fill the above-defined volume entirely. By holding the hemisphere in a certain position relative to the vertical, the hemisphere can be filled with liquid when the rotary motion is applied. This liquid is ejected from the sphere when the hemisphere takes up another position relative to the vertical, and when the same rotary motion is applied.

That device can dispense a dose of liquid of about 5 microliters to within 0.3%.

The main drawback with that device is that it is quite bulky because the hemisphere must be able to tilt about an axis through an angle of about 3 degrees on either side of the vertical. Therefore, it is not possible to draw off/dispense a predetermined quantity of liquid from/into a receptacle having an access which has a small amount of clearance, e.g. a test tube.

In particular, an object of the present invention is to mitigate this drawback.

To be more precise, one of the objects of the invention is to provide apparatus for drawing off and dispensing a predetermined quantity of a liquid, which apparatus can be used in receptacles having small access openings.

SUMMARY OF THE INVENTION

This object and other objects which become clear below are achieved by means of apparatus for drawing off and dispensing a predetermined quantity of liquid, said apparatus being of the type including a tube designed to contain said predetermined quantity of liquid, said tube having an open end via which said liquid is both drawn in and dispensed, said tube being closed at its end opposite from said open end via which said liquid is both drawn in and dispensed, the inside volume of said tube corresponding to said predetermined quantity, said tube being rotated about an axis by drive means, said tube being disposed on a surface whose distance from said axis increases or remains constant going from said closed end to said open end, so that, when said drive means rotate the tube in one direction, it is fully filled with the liquid in which said open end is immersed, and so that, when said drive means rotate said tube in the opposite direction, it is fully emptied of the liquid that it contains.

Preferably, said tube is helical in shape.

Advantageously, said surface is conical in shape.

Advantageously, said tube is threaded around a central cylinder and/or embedded in a material forming an outer cylinder, said supporting cylinder and/or said outer cylinder being rotated by said drive means.

In a preferred embodiment, said cylinder is coupled to said drive means by a quick-action releasable fastening system.

BRIEF DESCRIPTION OF THE DRAWINGS

Other characteristics and advantages of the invention will appear on reading the following non-limiting description of a preferred embodiment, given by way of explanation with reference to the accompanying drawings, in which:

FIGS. 6, 7 and 8 are views showing a way of coupling the pipette to drive means.

DESCRIPTION OF THE PREFERRED EMBODIMENTS

Figure 1:
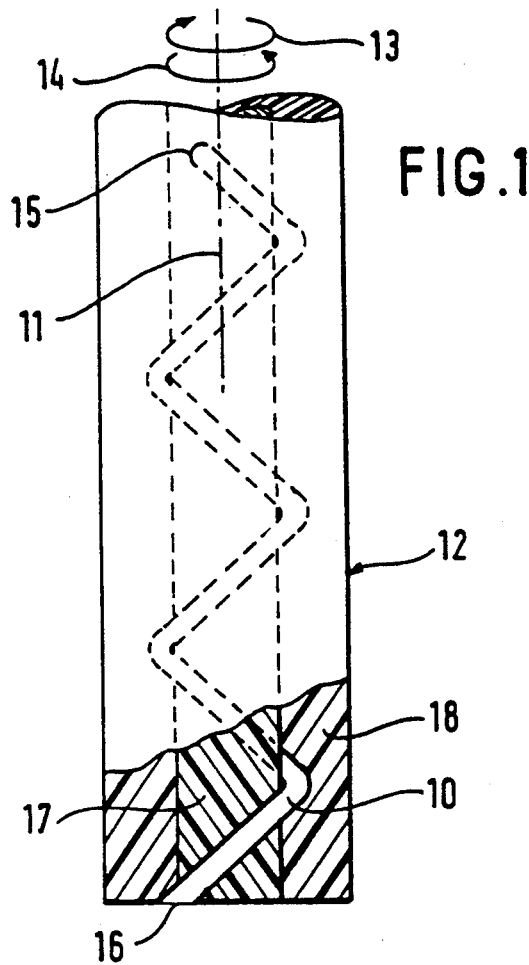
FIG. 1 shows a pipette of an embodiment of the invention.

FIG. 1 shows a pipette of an embodiment of the invention.

An apparatus of the invention is constituted by a hollow tube 10 which is, for example, helix-shaped. The central axis of symmetry of the tube 10 is referenced 11. The helical tube 10 has a closed top end 15 and an open bottom end 16 via which liquid is both drawn in and dispensed.

When the bottom end 16 of the tube 10 is immersed in a liquid, a certain quantity of which is to be drawn off, a small quantity of the liquid penetrates into the tube 10 by capillary action. The tube 10 is rotated in one direction 13, thereby applying a component of centrifugal force to the liquid penetrating into the tube 10 so that the liquid is caused to rise up inside the tube 10.

In the invention, the tube 10 is also emptied by centrifugal force being applied to the liquid present inside the tube 10. This centrifugal force enables the liquid to be removed and is obtained by rotating the tube 10 in a direction 14 opposite to the direction 13.

The tube is rotated by drive means that are not shown in this figure.

In a first embodiment, the tube 10 is wound or threaded around a solid central cylinder 17, e.g. made of plastic. The tube 10 may be fixed around the cylinder 17 in various ways, e.g. by gluing.

In a variant embodiment, the cylinder 17 and the tube 10 are embedded in a material 18, e.g. also made of plastic, so that the material 18 constitutes an outer cylinder 12.

Figure 2:
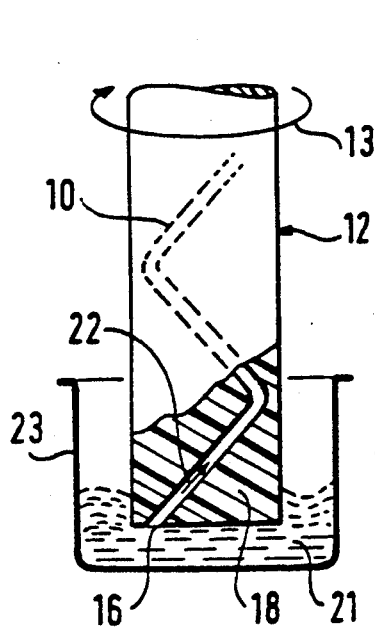
FIGS. 2, 3 and 4 show the three successive stages of drawing off a liquid and dispensing it by means of a pipette which constitutes another embodiment of the invention.
Figure 3:
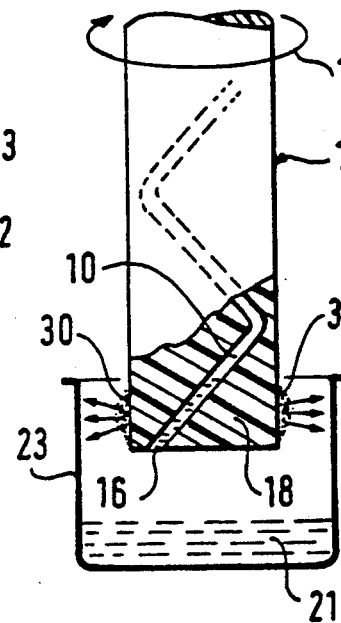
Figure 4:
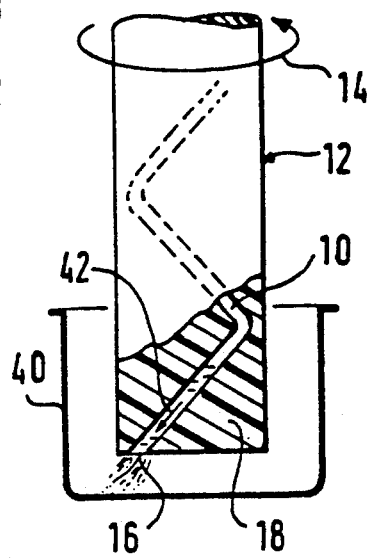

In another embodiment, a material constituting the outer cylinder may be molded over the tube 10, as shown in FIGS. 2, 3 and 4.

For example, the tube 10 may be made of glass or of stainless metal and its inside volume may be of the order of a few microliters. The bottom end 16 of the tube 10 advantageously has a circular section in the plane containing the base of the cylinder 12.

FIG. 2 shows how a determined quantity of liquid can be drawn off by means of the present invention.

The pipette shown is constituted by a tube 10 overmolded by a material 18 forming an outer cylinder 12.

Firstly, the open end 16 of the tube 10 is immersed in a liquid 21, a certain quantity of which is to be drawn off. The liquid 21 is contained in a receptacle 23. The depth to which the end 16 of the tube 10 penetrates into the liquid 21 depends in particular on the nature of the liquid 21, its surface tension and its fluidity.

The liquid is drawn off by actuating the drive means so that the cylinder 12 rotates about its central axis 11 (FIG. 1) in the direction 13.

When the cylinder rotates at high speed, the liquid 21 rises up inside the tube 10 due to the centrifugal force applied, as shown by arrow 22. The tube 10 fills entirely with the liquid 21 and the air contained in the tube 10 is firstly compressed towards the top end 15 of the tube 10, and is then diluted with the liquid under pressure before being evacuated via the opening 16.

For example, the speed of rotation of the cylinder 12 is about 7,000 revolutions per minute (r.p.m.). Such a speed of rotation fills the tube 10 wi liquid 21 in a few tenths of a second.

Secondly, the bottom end 16 of the tube 10 is removed from the liquid 21, while continuing to rotate in direction 13, as shown in FIG. 3.

The droplets 30 remaining in contact with the outside surface of the cylinder 12 due to their surface tension are spun off the cylinder 12 by the centrifugal force resulting from the cylinder 12 rotating. In this way, only a given quantity of liquid contained inside the tube 10 is drawn off.

Thirdly, the liquid contained in the tube 10 is evacuated from the tube into another receptacle 40, as shown in FIG. 4. For example, this receptacle is constituted by a test tube, as is receptacle 23. The liquid is dispensed by actuating the rotary drive means so that the cylinder 12 rotates in the opposite direction 14. This direction of rotation 14 enables a centrifugal force to be applied to the liquid contained in the tube 10, so as to expel the liquid out of the tube 10 via its end 16 in a direction 42.

After a few tenths of a second, the tube 10 no longer contains any liquid at all, and the receptacle 40 contains a volume of liquid that is equal to the volume drawn off into the tube 10 from the receptacle 23 to within 0.3%

For speeds of rotation of about 7,000 r.p.m., centrifuging is such that no particle cf liquid remains inside the tube 10 or on the outside surface of the cylinder 12. The present invention therefore enables a quantity of liquid to be drawn off and dispensed without subsequent contamination. It is therefore not necessary to sterilize apparatus of the invention after use n order to avoid outside contamination.

Moreover, apparatus of the invention enables very small quantities of liquid, of the order of a few microliters, to be dispensed, as a function of the inside volume of the tube 10.

The inside diameter of the tube 10 and its overall height depend on the volume of liquid to be drawn off.

The diameter of the cylinder 12 enclosing the tube 10 is about 5 mm. This compactness enables a liquid to be drawn off from and dispensed into receptacles having small accesses, e.g. test tubes. Confining he tube 10 inside another material protects it from shocks. This is particularly important if the tube 10 is made of glass.

Another advantage of the invention is that it enables a liquid to be measured to within 0.3%, i.e. the invention may advantageously be used to measure reagents. The very small quantities of liquid drawn off enable considerable savings of reagent to be made. During medical analyses, the reactions to be observed may take place with very small quantities of reagent if these quantities can be measured exactly.

It should be noted that in order to change the direction of rotation in the invention, it is necessary to go via a stop position. In this situation, the liquid contained in the tube 10 does not run ut in view of the small diameter of the open end of the tube.

The tube 10 is not necessarily helical in shape. The tube must merely be at a distance from the axis of rotation over the entire length of the tube, which distance may increase going from the closed end 15 o the open end 16. The basic requirement is that the distance relative to the axis of rotation increases or remains constant going from the closed end 15 to the open end 16.

An increasing distance corresponds to the tube 10 being fixed on a conical surface, and a constant distance corresponds to a cylinder.

The cylinder 12 containing the tub 10 constitutes a means for driving the tube 10 and it ca be temporarily coupled to mechanical drive means.

Figure 5:
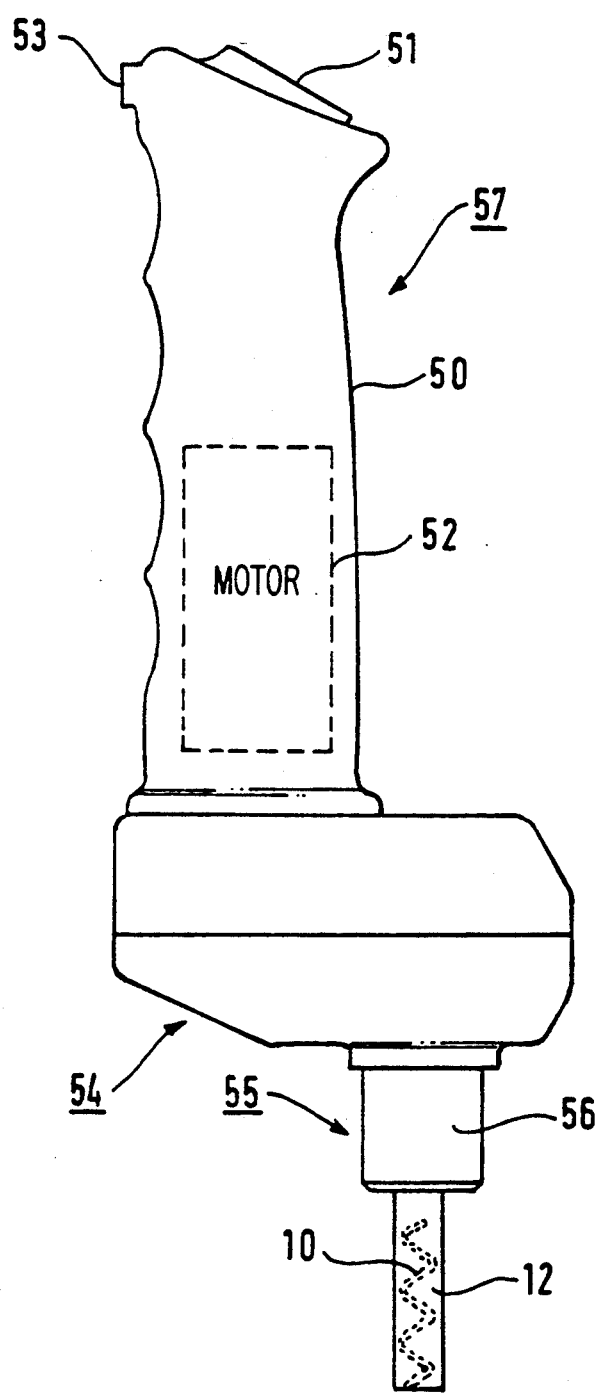
FIG. 5 shows a way of using a pipette of the invention.

FIG. 5 shows an advantageous way of using apparatus of the invention.

The tube 10, e.g. contained in a cylinder 12, is fixed to a device 57 via a coupling device 55 including a chuck 56. The device 57 comprises an ergonomic handle 50, a motor 52, and a transmission system for transmitting the rotary motion of the motor 52 to the cylinder 12, which transmission system is contained in a housing 54 fixed to the base of the handle 50. The direction of rotation of the motor 52, and therefore of cylinder 12 enclosing the tube 10, is controlled by a 3-position switch placed on the top of the handle 50. The switch 51 enables the motor 52 to be rotated to the right and to the left, nd to be stopped.

The motor 52 may be of the electric type or of the pneumatic type. A pneumatic motor has the advantage of being less restricting to use. If a pneumatic motor is used, the handle 50 has an inlet 53 for air under pressure. However, this embodiment requires the presence of a source of compressed air. In the event that n electric motor is used, a location must be provided for batteries (rechargeable or otherwise), but the device may then be used without any other equipment. On-board use is then possible.

The cylinder 12 containing the tue 10 constitutes an interchangeable part. Advantageously, the volume of the tube 10 varies from one part to another, so that it is possible to draw off and dispense different quantities of liquid depending on the part used.

In order to enable parts to be interchanged easily, the means for coupling the part to the drive means are, for example, of the Bilz type or of the type having latches.

Quick-action fastening means for fixing a part to the drive means quickly are shown in FIG. 6.

FIG. 6 shows an embodiment of the means for coupling a pipette of the invention to the drive means.

A drive shaft 60, FIG. 6 coupled to the FIG. 5 motor 52 is rotated in a direction defined by the position of the switch 51. The direction of rotation that enables a quantity of liquid to be drawn off depends on the winding direction of the helical tube 10.

The drive shaft 60 drives a toothed wheel 61 which cooperates with another toothed wheel 62 positioned between ball bearings 63, 64 fixed to respective outer casing halves 65, 66 brought together to form a housing. The toothed wheel 62 is constituted by the top portion of a hollow sleeve 79 containing a coil spring 67 having its top end fixed or applied against a washer 68 which is held by a spring clip 69.

The bottom end of the spring 67 stands on a circular metal part 70 whose top portion has a cylinder for centering and holding the spring 67. The central portion 71 of the part 70 is larger in diameter than an inwardly-projecting rim 73 of the sleeve.

In a low position, i.e. when there is no pipette engaged in the drive means, the bottom surface of the central portion 71 bears against the to face of the rim 73. The bottom portion 72 of the part 70 penetrates into an orifice delimited by the rim 73 and bears against the top surface of the pipette 74 when such a pipette is engaged in the rotary drive device. For example, he pipette 74 is constituted by a central cylinder 17 around which the tube 10 is threaded, and is molded inside an outer cylinder 12, as shown in FIG. 1. Naturally, this embodiment is non-limiting, and the pipette may also be constituted by the tube 10 on its own, the pipette then being coupled to said rotary drive means in a suitable manner In FIG. 6, the bottom portion 72 of the part 70 bears against the top surface of the cylinder 17 over which the tube 10 is slid.

The pipette 74 is coupled to the rotary drive means by a mechanism which may be better understood with reference to FIG. 7.

FIG. 7 shows the means for coupling the pipette 74 to the drive means. This figure corresponds to a section on an axis VII—VII seen from the right.

A cylinder 75 projecting relative o the cylinder formed by the pipette 74 passes through the top portion of the pipette 74 from one side to the other. The length of the cylinder 75 is less than the diameter of a cut-out 76 provided in the bottom portion of the sleeve. The cut-out 76 is circular in shape and includes a through orifice in its middle, through which orifice the top portion of the pipette 74 passes.

When the pipette 74 is inserted into the drive means, the cylinder 75 is engaged in a groove 77 provided in the bottom portion of the sleeve. The top portion of the pipette 74 compresses the spring 67. The pipette 74 then needs merely to be turned through 90 degrees for the cylinder 75 to be engaged in an oblong slot 78 when the pipette 74 is released. The cylinder 75 then bears against the top portion of the slot 78. Rotating the sleeve then enables a rotary moment to be applied t the pipette 74.

FIG. 8 shows a section on VIII—VIII of the drive device in which a pipette is engaged.

The sleeve has two grooves 77 in which the ends of the cylinder 75 are engaged. Rotating the pipette 74 through 90 degrees brings these ends to face two oblong slots 78, into which slots the ends penetrate under the action of the spring 67.

This fixing method enables pipette to be interchanged quickly without having to use much force. A spring having 100 grams pressure is sufficient for holding the pipette.

The length of the pipette that extends beyond the drive means is preferably quite short, of the order of a few centimeters, so that the bottom end of he pipette does not wobble due to the high speed of rotation.

The liquid is subjected to considerable pressure when penetrating into the tube 10 and when being expelled therefrom. This pressure both ensures hat the volume contained in the tube 10 is highly accurate, and also prevents any impurities from remaining on the inside walls of the tube 10 and on its outside walls if the tube is not coated with a material constituting an outer cylinder.

Compared with the above-mentioned state-of-the-art pipette, the present invention enables redetermined quantities of liquid to be drawn off from receptacles having small access openings.

Naturally, the tube 10 need not necessarily be in the shape of a helix having a full turn, an it may alternatively be in the shape of a truncated helix, depending on the volume of liquid to be drawn off. The size and the pitch of the helix must be optimized for each quantity of liquid to be drawn off.

I claim:

1. In an apparatus for drawing off and dispensing a predetermined quantity of liquid, said apparatus including a tube designed to contain said predetermined quantity of liquid, said tube having an open end the improvement wherein said tube is closed at an end opposite from said open end via which said liquid is both drawn in and dispensed, an inside volume of said tube corresponds to said predetermined quantity, said tube being rotated about an axis by drive means, said tube being spaced at a sufficient distance from said axis over the complete length of the tube from said closed end to said open end, such that said tube winds around said axis, and when said drive means rotate the tube at high speed in one direction, said tube is fully filled with liquid with said open end immersed in liquid, and when said drive means rotate said tube at high speed in the opposite direction, said tube is fully emptied of the liquid the tube contains.

2. Apparatus according to claim 1, wherein said tube is helical in shape and said distance is constant.

3. Apparatus according to claim 1, wherein said tube is a spiral of conical shape and said distance constantly changes over the full length of the tube.

4. Apparatus according to claim 1, wherein said tube is threaded around a supporting cylinder and embedded in a material forming an outer cylinder, and said drive means rotates one of said supporting cylinder and said outer cylinder.

5. Apparatus according to claim 4, wherein at least said supporting cylinder is coupled to said drive means by a quick-action releasable fastening system.

* * * * *